(12) United States Patent
Pichkur

(10) Patent No.: US 8,319,373 B2
(45) Date of Patent: Nov. 27, 2012

(54) SYSTEM, SOCKET AND PLUG APPARATUS FOR DC POWER DISTRIBUTION AND USAGE

(76) Inventor: Yaroslav A. Pichkur, Ridgewood, NY (US)

( * ) Notice: Subject to any disclaimer, the term of this patent is extended or adjusted under 35 U.S.C. 154(b) by 0 days.

(21) Appl. No.: 13/135,121

(22) Filed: Jun. 23, 2011

(65) Prior Publication Data

US 2011/0316341 A1  Dec. 29, 2011

Related U.S. Application Data

(63) Continuation of application No. PCT/US2009/003277, filed on May 29, 2009, which is a continuation-in-part of application No. 12/317,608, filed on Dec. 26, 2008.

(51) Int. Cl.
*H02J 1/00* (2006.01)
*H02J 3/00* (2006.01)
(52) U.S. Cl. .......................................... 307/72
(58) Field of Classification Search ...................... 307/72
See application file for complete search history.

(56) References Cited

U.S. PATENT DOCUMENTS

| | | |
|---|---|---|
| 3,414,806 A | 12/1968 | Carr |
| 5,164,652 A | 11/1992 | Johnson et al. |
| 5,264,958 A | 11/1993 | Johnson |
| 5,297,015 A | 3/1994 | Miyazaki et al. |
| 5,341,124 A | 8/1994 | Leyden et al. |
| 5,397,929 A | 3/1995 | Hogarth et al. |

(Continued)

FOREIGN PATENT DOCUMENTS

DE   1 615 003   3/1971

(Continued)

OTHER PUBLICATIONS

"Switched-mode power supply", Wikipedia.com, Jul. 9, 2008.

(Continued)

*Primary Examiner* — Rexford Barnie
*Assistant Examiner* — Dru Parries
(74) *Attorney, Agent, or Firm* — Tiajoloff and Kelly LLP

(57) ABSTRACT

A power supply system comprises an electrical power generating device producing DC electrical power in the form of a DC electrical current, a DC current conductor receiving the DC electrical current from the electrical power generating device and carrying the DC electrical current to a socket, and an AC power system transmitting AC electrical current to the socket so that the socket can be accessed by a plug inserted therein to receive the DC current or the AC current from it. The socket has four recesses in it, and each recess has a respective contact therein. Each recess is configured to receive a respective prong and make a respective electrical contact with the plug therein. A first of the contacts transmits the DC current, a second and third of the contacts transmit complementary poles of the AC electrical current, and a fourth contact connects with a grounded connection. A DC-powered electrical device has a plug with a plug body and three prongs supported on and extending from the plug body. The prongs include two AC connection prongs and a ground connection prong corresponding to prongs of a standard three-prong plug. The plug further has a fourth prong supported on the plug body into the socket to contact the DC current recess. The fourth prong is removable from the plug body, or is movably supported on the plug body so that the fourth prong may be removed or moved so that the plug can be plugged into a standard three-recess AC socket.

21 Claims, 12 Drawing Sheets

U.S. PATENT DOCUMENTS

| | | | |
|---|---|---|---|
| 5,535,274 A | 7/1996 | Braitberg et al. |
| 5,660,567 A | 8/1997 | Nierfich et al. |
| 5,783,926 A | 7/1998 | Moon et al. |
| 5,803,754 A | 9/1998 | Wilhelm |
| 5,818,197 A | 10/1998 | Miller et al. |
| 5,822,427 A | 10/1998 | Braitberg et al. |
| 5,836,785 A | 11/1998 | Lee |
| 5,901,056 A | 5/1999 | Hung |
| 6,057,610 A | 5/2000 | Nierescher |
| 6,061,261 A | 5/2000 | Chen et al. |
| 6,064,177 A | 5/2000 | Dixon |
| 6,172,891 B1 | 1/2001 | O'Neal et al. |
| 6,328,584 B1 | 12/2001 | Follett |
| 6,362,987 B1 | 3/2002 | Yurek et al. |
| 6,368,155 B1 | 4/2002 | Bassler et al. |
| 6,369,463 B1 | 4/2002 | Maiorano |
| 6,386,906 B1 | 5/2002 | Burke |
| 6,509,659 B1 | 1/2003 | Carroll et al. |
| 6,560,131 B1 | 5/2003 | vonBrethorst |
| 6,605,881 B2 | 8/2003 | Takehara et al. |
| 6,669,495 B2 | 12/2003 | Philips et al. |
| 6,690,277 B1 | 2/2004 | Hansen et al. |
| 6,698,597 B2 | 3/2004 | Marihugh |
| 6,761,579 B2 | 7/2004 | Fort et al. |
| 6,799,994 B2 | 10/2004 | Burke |
| 6,811,444 B2 | 11/2004 | Geyer |
| 6,845,023 B2 | 1/2005 | Philips et al. |
| 6,896,543 B2 | 5/2005 | Fort et al. |
| 7,015,596 B2 | 3/2006 | Pail |
| 7,035,126 B1 * | 4/2006 | Lanni .......................... 363/142 |
| 7,134,887 B1 | 11/2006 | Keely |
| 7,140,922 B2 | 11/2006 | Luu et al. |
| 7,215,047 B2 | 5/2007 | Lilie |
| 7,285,874 B2 | 10/2007 | Menas et al. |
| 7,367,821 B2 | 5/2008 | Leslie et al. |
| 2001/0049222 A1 | 12/2001 | Fort et al. |
| 2002/0055288 A1 | 5/2002 | Philips et al. |
| 2002/0154243 A1 | 10/2002 | Fife et al. |
| 2002/0189842 A1 | 12/2002 | Burke |
| 2003/0036806 A1 | 2/2003 | Schienbein et al. |
| 2003/0211767 A1 | 11/2003 | Philips et al. |
| 2004/0066094 A1 | 4/2004 | Suzuki et al. |
| 2004/0229498 A1 | 11/2004 | Fort et al. |
| 2005/0102043 A1 | 5/2005 | Menas et al. |
| 2007/0121266 A1 | 5/2007 | Leslie et al. |
| 2008/0031026 A1 | 2/2008 | Menas et al. |
| 2009/0152947 A1 | 6/2009 | Wang |
| 2011/0084555 A1 | 4/2011 | Pan |
| 2011/0089759 A1 | 4/2011 | Pan |

FOREIGN PATENT DOCUMENTS

| | | |
|---|---|---|
| EP | 0 944 148 A2 | 9/1999 |
| FR | 2 489 230 | 3/1982 |
| FR | 2 678 796 | 1/1993 |

OTHER PUBLICATIONS

Yaroslav Pichkur, "Proposal to establish new wiring standard in homes equipped with solar panels in order to eliminate power loss due to conversion between AC and DC".

* cited by examiner

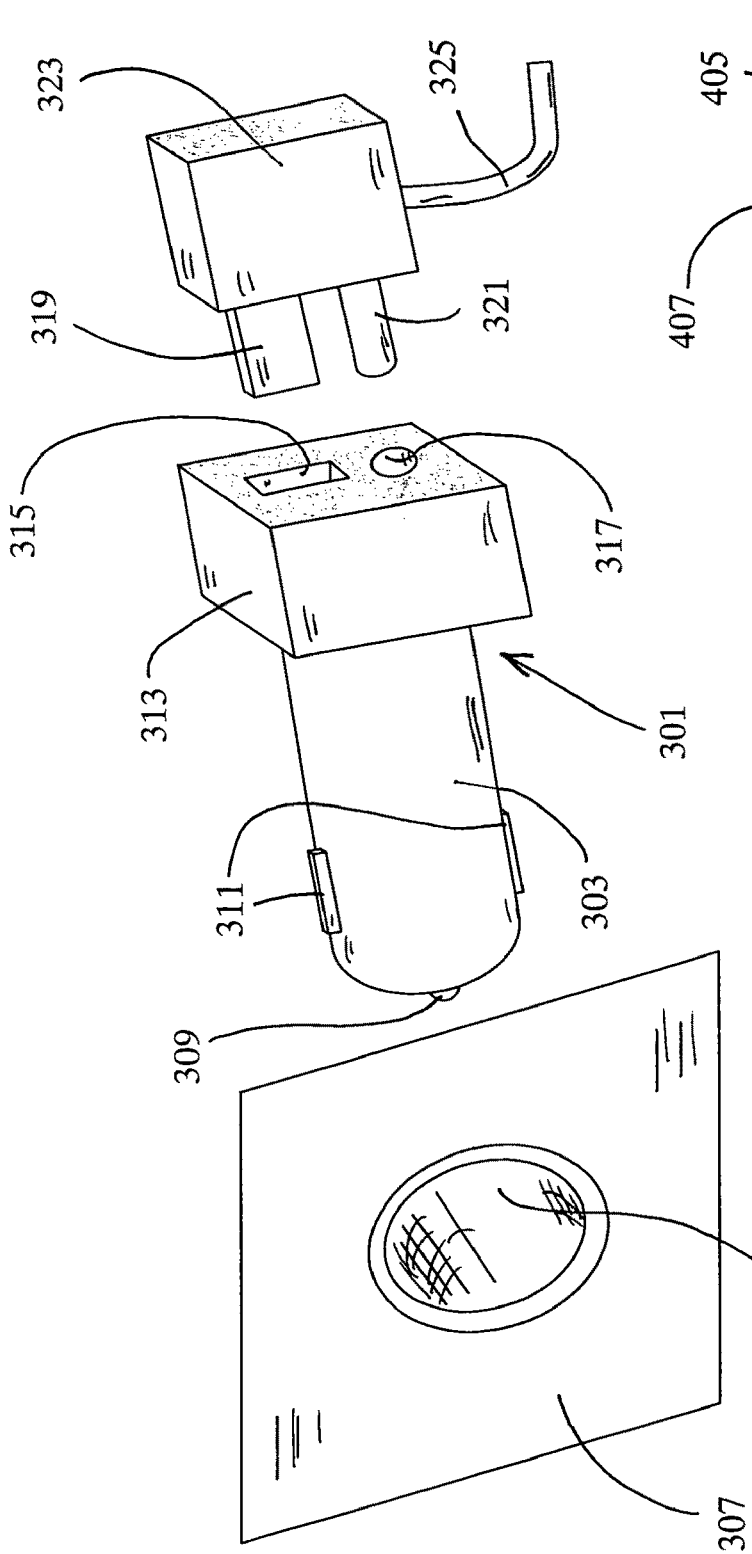
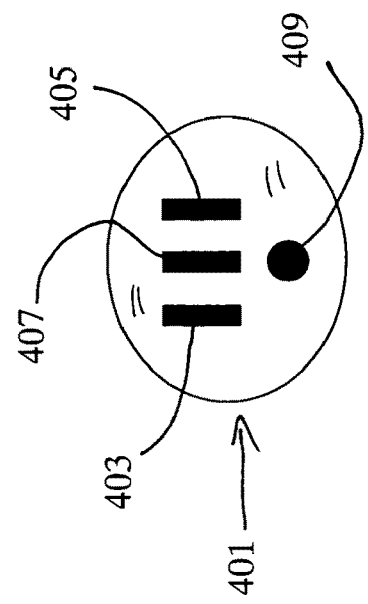
FIG. 19
FIG. 20

US 8,319,373 B2

SYSTEM, SOCKET AND PLUG APPARATUS FOR DC POWER DISTRIBUTION AND USAGE

RELATED APPLICATIONS

This application is a continuation of PCT application Ser. No. PCT/US2009/00327, which was filed on May 29, 2009 and designated the United States, Published on Jul. 1, 2010,as International Publication No. WO 2010/074692 A1 and herein incorporated by reference, and which was a continuation-in-part of U.S. patent application Ser. No. 12/317,608 filed Dec. 26, 2008.

FIELD OF THE INVENTION

This invention relates to systems for creating or supplying DC power, and to apparatus supplying DC power to electronic devices.

BACKGROUND OF THE INVENTION

Most systems for producing energy locally, such as by converting solar energy or wind energy to electricity, produce electrical power in the form of DC current at a voltage of, for example, 12 volts. This DC current output of the power generator is then converted to AC current and supplied to power the associated building via the standard AC electrical system of the building. Where there is no power usage in the building and there is an excess of generated DC power, the DC current may be used directly to charge a battery storing the power for future use. When power is need in the building this battery discharges, providing DC current, which is also converted to AC current and transmitted as AC current to the standard AC electrical system of the building.

As is well known, buildings in most of the world are supplied with electrical power in the form of AC current sent to sockets in the walls of buildings. These sockets are usually standard sockets for the given country. For example in the U.S., sockets are usually in the form of two parallel slots. One contact in the socket connects to one pole of an AC current supply and the other contact in the socket connects with a complementary pole of the AC current supply. These poles of the AC current usually referred to as the phase and the other the neutral.

AC power is obtained at the socket by plugging a standard two-prong plug into the socket. The two-prong plug has two rectangular AC connection prongs that are inserted into the two slots or recesses in the socket so as to make contact with springing metal contacts that supply AC current to those prongs. As a result, a circuit with flowing AC current is formed by a device electrically connected between the two prongs.

As is also well known, in addition to such a standard two-plug AC plug and socket arrangement, the socket may have a third recess or slot, usually circular in cross section, that receives a third cylindrical prong of a standard three-prong plug, and contacts this third prong and connects it to a grounded connection.

At the same time, more and more devices now rely on DC current for operation, including computers, computer speakers, lighting, televisions, cordless telephones, answering machines, video games, cordless tools, and many other devices that rely on a DC power source to operate. These devices normally derive power from a standard AC plug that takes AC current at the local voltage (in the U.S. 110 volts) and sends it through an AC/DC converter that converts to 110 v. AC current to a DC current at a voltage appropriate for the associated device. Presently about 6% of the U.S. power consumption is attributable to such low-power DC devices.

Where the device is used in a building with its own DC electrical power generation, the result is that the DC current from the solar or windmill or other generator is converted to DC current, with a consequent loss of 10 to 15% of total power to the conversion. A subsequent conversion of the AC to DC, depending on the type of transformer or converter used, results in an additional loss of 30 to 70% of the power of the AC. As a result, the use of a DC electrical device in a building powered by a DC generator such as a photoelectric panel system or a wind power generator is extremely inefficient relative to the solar or wind energy captured.

Transmission of both AC and DC power to the various sockets of the building is not readily possible because sockets as presently configured provide only two slots for AC power and possibly a third circular recess providing a ground connection. Changing this configuration is undesirable because many devices rely on AC current and have plugs configured to use the standard two- or three-prong sockets. Supplying DC power to the standard socket for use with a DC power device with a standard AC plug would potentially result in confusion and damage if a DC device were plugged in to an AC socket.

SUMMARY OF THE INVENTION

It is therefore an object of the present invention to provide an efficient system and method for powering DC-powered devices in a building wherein some or all of the power is generated locally as DC current, such as by solar or wind conversion.

It is further an object of the invention to provide for a wall socket in which both DC and AC power are provided without requiring use of special adaptors or plugs for access of the AC power.

It is further an object of the invention to provide a plug design for a DC-powered electronic device that can be used to access either DC power or AC power from a socket according to the invention, and can also access AC power from a standard two- or three-prong AC power socket and use that AC power to power the device.

According to an aspect of the invention, a power supply system comprises an electrical power generating device producing DC electrical power in the form of a DC electrical current, a DC current conductor receiving the DC electrical current from the electrical power generating device and carrying the DC electrical current to a socket, and an AC power system transmitting AC electrical current to the socket so that the socket can be accessed by a plug inserted therein to receive the DC current or the AC current from it. The socket has two recesses in it, and each recess has a respective contact therein. Each recess is configured to receive a respective prong and make a respective electrical contact with the plug therein. A first and second of the contacts transmit complementary poles of the AC electrical current respectively. A third contact transmits the DC current. The socket has a fourth contact therein engageable with the plug to make a further electrical contact therewith. The fourth contact connects with a grounded connection.

Preferably, the third contact is in a third recess configured to receive a corresponding third DC prong on the plug adjacent and extending alongside the two AC prongs. The DC prong is movable or removable so that the plug can be used in a standard socket as well.

The configuration of the socket corresponds to the standard plug and socket design of the given geographical location. In the U.S. the fourth contact is a fourth recess that receives a cylindrical plug prong that is used for connecting to ground in the U.S. plug configuration. In other locations, e.g., Argentina, this fourth recess is configured to receive a blade-type prong of the plug, used for the grounded connection. In Europe, the fourth contact is one or a pair of flat metal contacts in the perimeter of the socket, and the plug has coacting contacts on it that engage those contacts when inserted in the socket, as is well known in the art. The invention can be adapted to any standard of plug, however, provided it supports a ground connection.

According to another aspect of the invention, a wall socket supplying DC power and AC power in a building comprises a socket face having first and second recesses in it located in positions to receive prongs of a standard two-prong AC electrical plug. The socket has contacts in the recesses configured to electrically contact the prongs. The contacts each are electrically connected with a respective pole of the AC power so that an AC circuit is formed when a plug having prongs of the two-prong AC electrical plug is inserted in the socket. The socket has a third contact therein positioned to engage a ground contact of a standard three-wire AC electrical plug. The third contact connects with ground. The socket has a further recess therein having a contact therein configured to engage a plug prong when inserted therein and to supply to the plug prong the DC power, such that a DC circuit is formed between the plug prong and a further ground contact contacting the grounded contact of the third contact.

In a U.S. type application, the further ground contact is a recess for the ground prong of the standard three-prong plug. In a European application, the standard tongue contact provides the ground connection.

According to still another aspect of the invention, an electrical device comprises a DC-powered electrical apparatus operable using DC current, and a plug operatively associated with the DC-powered electrical apparatus so as to supply DC current thereto. The plug has two AC connection prongs supported on and extending from the plug body, corresponding to prongs of a standard two-prong plug, and a ground connection contact structure corresponding to a standard ground contact for the plug. The plug further has a further prong supported on the plug body and extending therefrom adjacent the two prongs. The further prong is removable from the plug body, or is movably supported on the plug body so that said further prong may be removed or moved so that the plug can be plugged into a standard two-recess AC socket.

Other objects and advantages of the invention will become apparent in the specification herein, and the scope of the invention will be set out in the claims.

BRIEF DESCRIPTION OF THE DRAWINGS

FIG. 19 is an exploded perspective view of an apparatus for providing DC power from an automobile electrical system to a plug according to an alternate embodiment of the invention.

FIG. 20 is an alternate design for the socket of the apparatus of FIG. 19.

DETAILED DESCRIPTION

Figure 1:
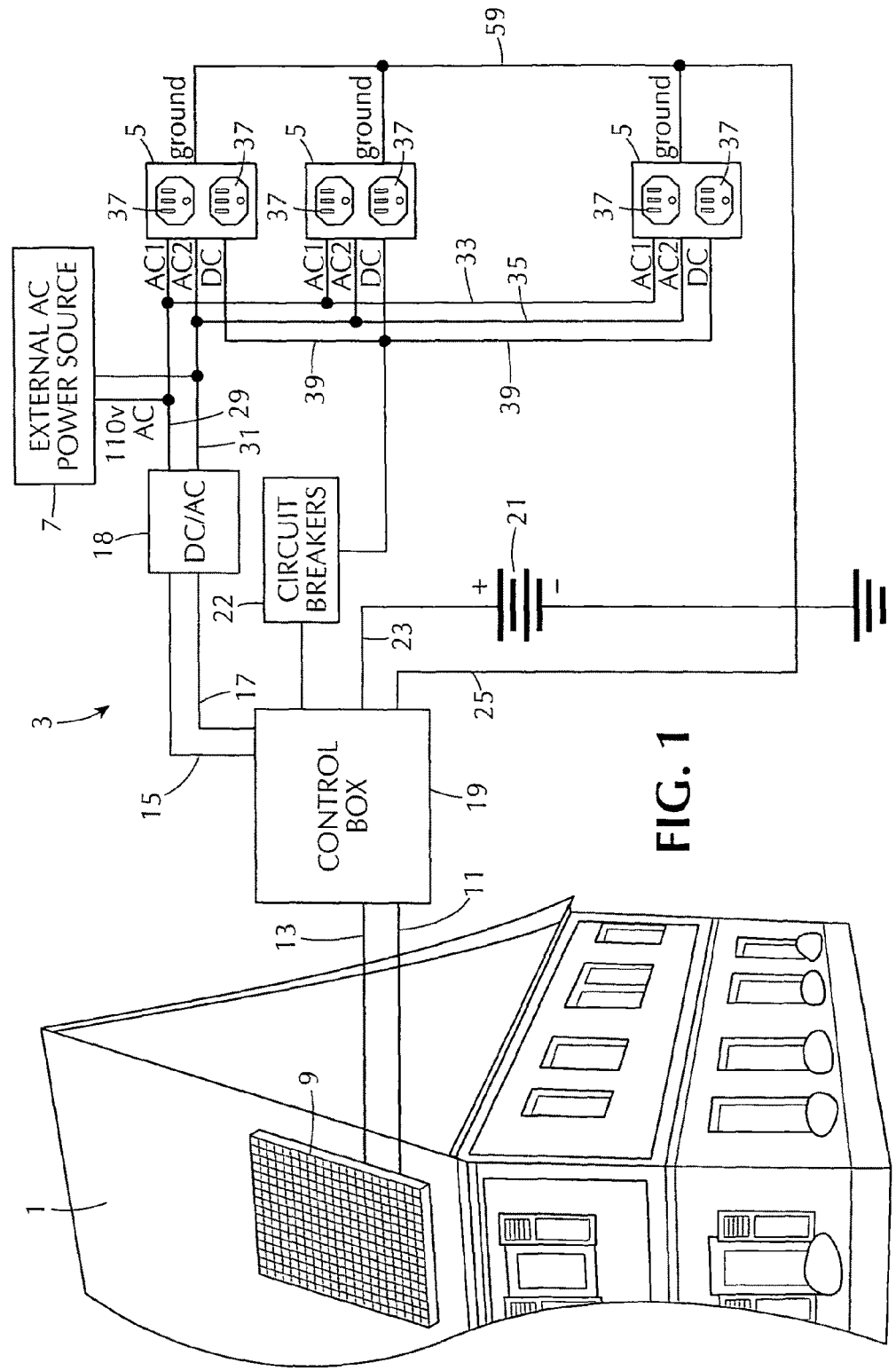
FIG. 1 is a schematic diagram of a building equipped with a power system according to a preferred embodiment of the invention.

Referring to FIG. 1, a building 1 is provided with a power supply system generally indicated at 3, providing electrical power to a plurality of wall sockets 5, distributed throughout the building 1.

Electrical power for the building is derived from one of two sources. One source is an external alternating current power source well known and generally used in the U.S., with AC current commonly coming from a utility that provides AC electrical power in the form of the usual U.S. 60 hertz alternating current at 110 volts. The other source 9 of electrical power is a local power generator at the building 1, which may be one of several types of devices, such as a solar panel or a wind-to-electrical power conversion windmill system (not shown), or another type of less usual source of power, such as tidal energy or geothermal energy.

The output of the local power generator 9 is normally 12 volt DC current transmitted along two positive and negative power lines 11 and 13. These lines of the DC power output by the generating device 9 are transmitted to a control circuit box 19 which contains a circuit that manages the usage of the locally generated DC power. This control box 19 transmits the electrical power in DC form to DC output lines 15 and 17 that transmit the electrical power to a DC-to-AC converter 18 that converts the DC current to 120 volt, 60 hertz AC, the AC current commonly used in U.S. alternating current power systems.

The power control circuit 19 also directs a portion of the DC power generated by the power generating device 9 to a battery 21 that is charged when the local power generating device 9 is producing electricity, as when a solar panel is receiving sunlight and converting it by a photoelectric effect into electricity. This battery is charged by the control circuit 19 so that it can discharge the accumulated power at times when the other generating device (9) is not active and is not producing electrical power, such as at night when a solar panel does not produce electricity. One line of the control circuit output 23 leads to one pole of a battery 21, which is charged as described above. The other output line 25 of the control circuit 19 connects to the other side of the battery 21 and to ground to create a closed circuit allowing charge of the battery 21. The power control circuit 19 is also configured to receive DC power from the battery 21 and to provide that DC power to the DC-to-AC converter 18 in those times when the local power generation device 9 is not producing DC power, to offset the AC power drawn from the local utility with stored locally generated energy.

When the DC power is converted to AC power, it results in two separate poles of AC current, herein referenced AC1, and AC2, transmitted along respective wiring lines 29 and 31. This AC power is normally that of a monophase alternating current system, and AC1 is the pole or line of AC referred to as the common or phase line, and AC2 is the line or pole referred to as "neutral". Connecting a device between AC1 and AC2 allows flow of AC current through the device to power it. The AC1 and AC2 currents are guided by lines 29 and 31 using standard AC building wiring 33 and 35, respectively, to supply both poles of the AC power to each of the sockets 37 of the various socket assemblies 5 throughout the building 1.

The control box 19 also transmits the positive side of the 12 volt DC power from the power generating device 9 (or from battery 21 when power is not being produced by device 9) directly to a further line running to circuit breakers 22 that transmit the DC power to a DC power distribution line 39 that distributes the DC power in the building, connecting to each of the sockets 37 of each of the socket assemblies 5 throughout the building 1. This is done a direct connection of the DC power source 9 or 21 to the line 39, without conversion of the DC power to AC power, as would be commonly the case in prior art solar power systems that waste a substantial fraction of the DC power generated.

The circuit breakers or fuses 22 interrupt the circuit of DC power supply to one or more of the sockets in the event that amperage exceeds a certain predetermined limit, e.g., 60 amperes. Circuit breakers or fuses are also preferably installed in the AC power lines 29, 31, 33, or 35, as is commonly provided in an AC in a power system for any building.

Figure 2:
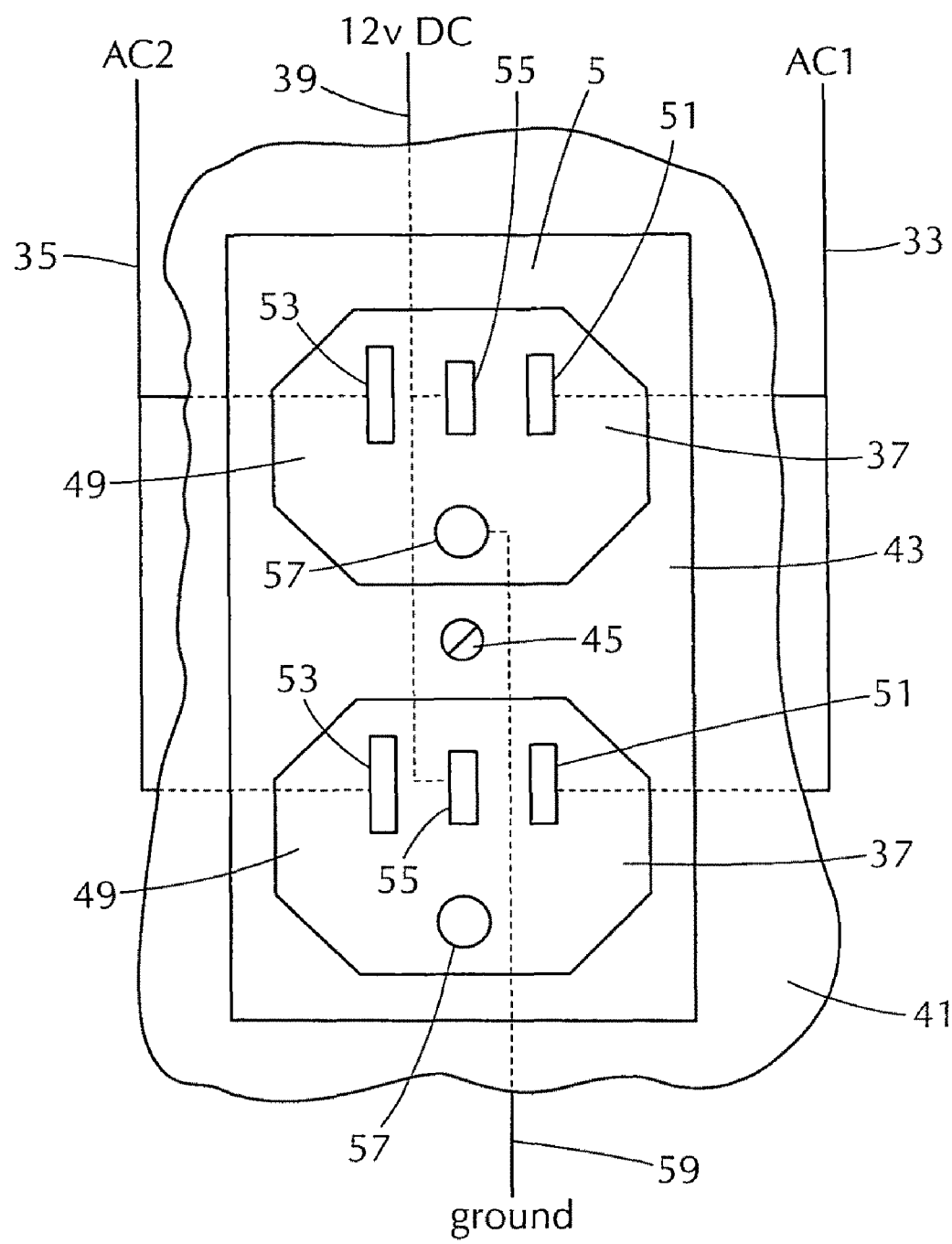
FIG. 2 is a detail view of a wall socket assembly according to a preferred embodiment of the invention.

As best seen in FIG. 2, the socket assemblies 5 are each supported within an aperture in a wall structure 41 of the building 1. The socket assembly 5 comprises two or potentially more or fewer sockets 37. The sockets 37 are supported within a standard socket box, not shown, and wiring is connected in the socket box to contacts in the various recesses of each socket 37, as is well known in the art. The sockets 37 themselves are supported in the behind a faceplate 43 secured to the wall by securement screw 45. Each of the sockets 37 has a usually octagonal face surface portion 47 that is an industry standard so that it will fit through standardized faceplates such as faceplate 43. The octagonal face shape and size are desirable to allow use of the sockets 37 with pre-existing faceplates, but the socket may be in any shape appropriate to the faceplate used, e.g., rectangular.

The plug 37 is configured to accommodate the prongs of a standard two-prong plug or a standard three-prong plug and to supply DC current to an additional prong not found in standard two- or three-prong plugs. For this, each of the sockets 37 is provided with elongated apertures or slots 51, 53 and 55 therein and a fourth slot or aperture 57, usually circular in shape. Slots 51 and 53 correspond to the standard sized slots for a two prong or three prong standard AC power plug. Slot 51 and slot 53 both have therein, as is commonly known in the art, metallic contact surfaces that are usually slightly biased inward to pinch on any blade-type prong inserted therein so as to form an electric contact with it. The contact in recess 51 is connected with line 33 which supplies to it the phase or common pole AC1 of the AC current, and slot 53 is connected with AC power line 35 which supplies AC2, a complementary AC pole or neutral side of the circuit. As is visible in FIG. 2, the neutral slot 53 is normally slightly longer than the phase or common slot 51 for polarized plugs, in which the neutral connection is a larger size prong. Recess 57 is configured to have inserted into it a third prong, generally cylindrical in shape. In the recess 57, the prong also makes an electric contact which is connected to a line 59, which is grounded or leads to ground.

The positions of these three recesses are standardized and well-known to almost all persons in the U.S. As a consequence of this design, when a standard two-prong AC plug is inserted into recesses 51 and 53 so as to engage the contacts therein, and this plug will derive AC power by bridging the lines between the AC1 phase current and the AC2 neutral side of the current, and can thus power any AC device attached thereto. Furthermore, the position of the aperture 57 is such that a standard three-prong plug may be inserted with two of its prongs or blades into recesses 51 and 53 and the standard cylindrical ground prong being inserted into recess 57 connecting with ground. This arrangement allows for AC operation deriving power by bridging the prongs in recesses 51 and 53, together with a connection to ground for shock prevention or other reasons.

In addition, according to the present invention, each socket 37 has a further recess 55 in it. Recess 55 has similar structure to that of recesses 51 and 53, in that it has a metallic material element or structure in it that is biased to pinch on a prong inserted into the recess 55 and to form an electric contact with that prong. The electrical contact in recess 55 is connected with the line 39 that supplies 12 volt DC current to each of the socket assemblies 5, and transmits that DC current to the prong in the recess 55.

Because 12 volt DC current is available at the recess 55 situated between recesses 51 and 53, it is possible to form a DC circuit by bridging the contact in recess 55 with ground in the ground contact 59 in recess 57 so that DC current flows between them, powering any DC circuit that is connected between them.

Figure 3A:
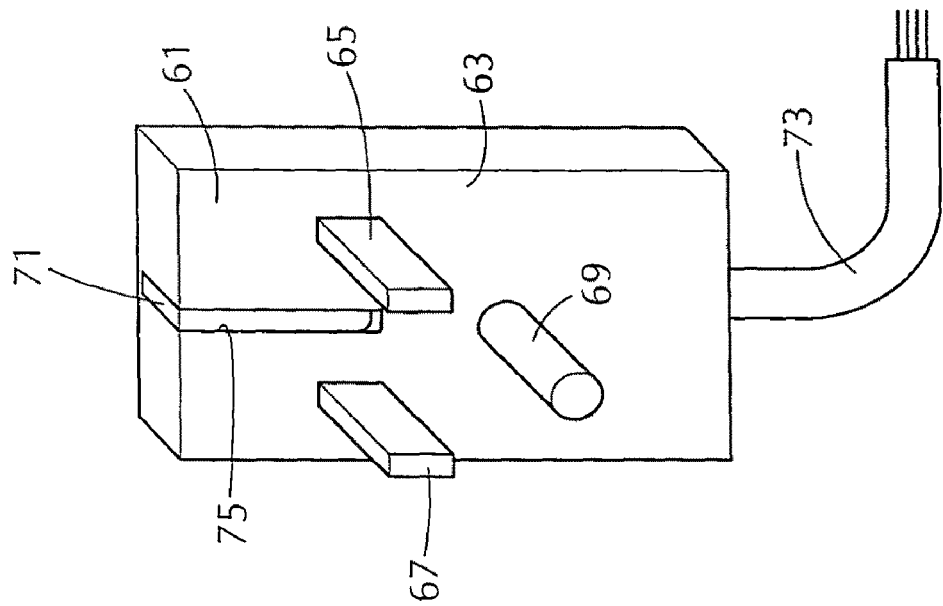
FIG. 3A is a perspective view of a plug apparatus for use in the power system of the invention.

FIG. 3A shows a plug structure suitable for use in the socket of FIG. 2. This plug structure comprises a plug body 61 having a face surface 63 from which project prongs for insertion into the corresponding socket 37. The prongs include prong 65 which is configured to enter into and form an electrical contact with the metallic element in recess 53 in such a socket as shown in FIG. 2 and prong 67 configured to enter and form an electrical contact with the element in recess 51 of socket 37. Cylindrical ground prong 69 is configured to be inserted into circular aperture 57 to form an electrical contact therein, with these three prongs being positioned and dimensioned according to the dimensions of a standard three-prong AC power plug.

Plug 61 also has a fourth prong 71 projecting outwardly from the front face 63 between prongs 65 and 67. Prong 71 is situated so as to extend into and form an electrical contact with a metallic contact element in slot 55 when prongs 65, 67, and 69 are fitted into the respective standard three-prong recesses 51, 53 and 57 in the socket 37. When the connections are made between all of the prongs, 65, 67 and 69 and their respective lines AC1, AC2, DC and ground, power is supplied by wire connector 73 to an associated electrical device, not shown, but which may be any electrical device that uses DC current.

Figure 3B:
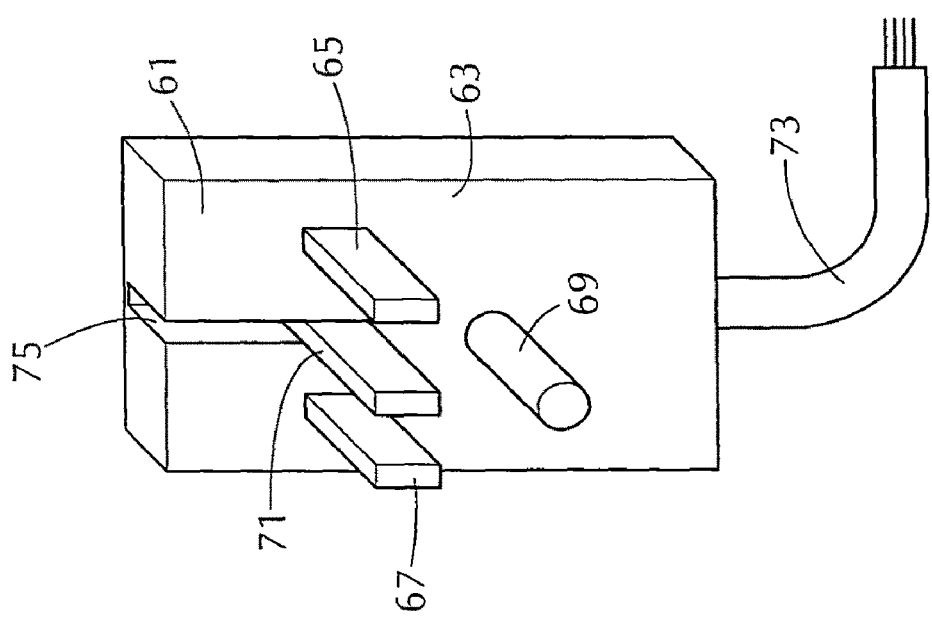
FIG. 3B is a view as in FIG. 3A wherein the middle prong is rotated out of the way for use of the plug in a standard socket.

Central prong 71 is supported on a pivot that allows the prong 71 to be rotated or pivoted between an extended position projecting from the front face 63 to a retracted position where it does not. The pivoting to the retracted position of the central prong 71 is shown in the comparison of FIG. 3A with FIG. 3B. As is seen in FIG. 3B, the prong 71 may be rotated so as to be completely within recess 75, so that the prong 71 is flush or recessed from the face 63 of the plug portion 61. When prong 71 is in this retracted position, the plug 61 can be inserted into a standard three prong plug for AC operation alone, because the prong 71 has been moved out of the way so that it does not interfere with the insertion of the other prongs 65, 67, 69 into the apertures of a standard three-prong socket.

Figure 4:
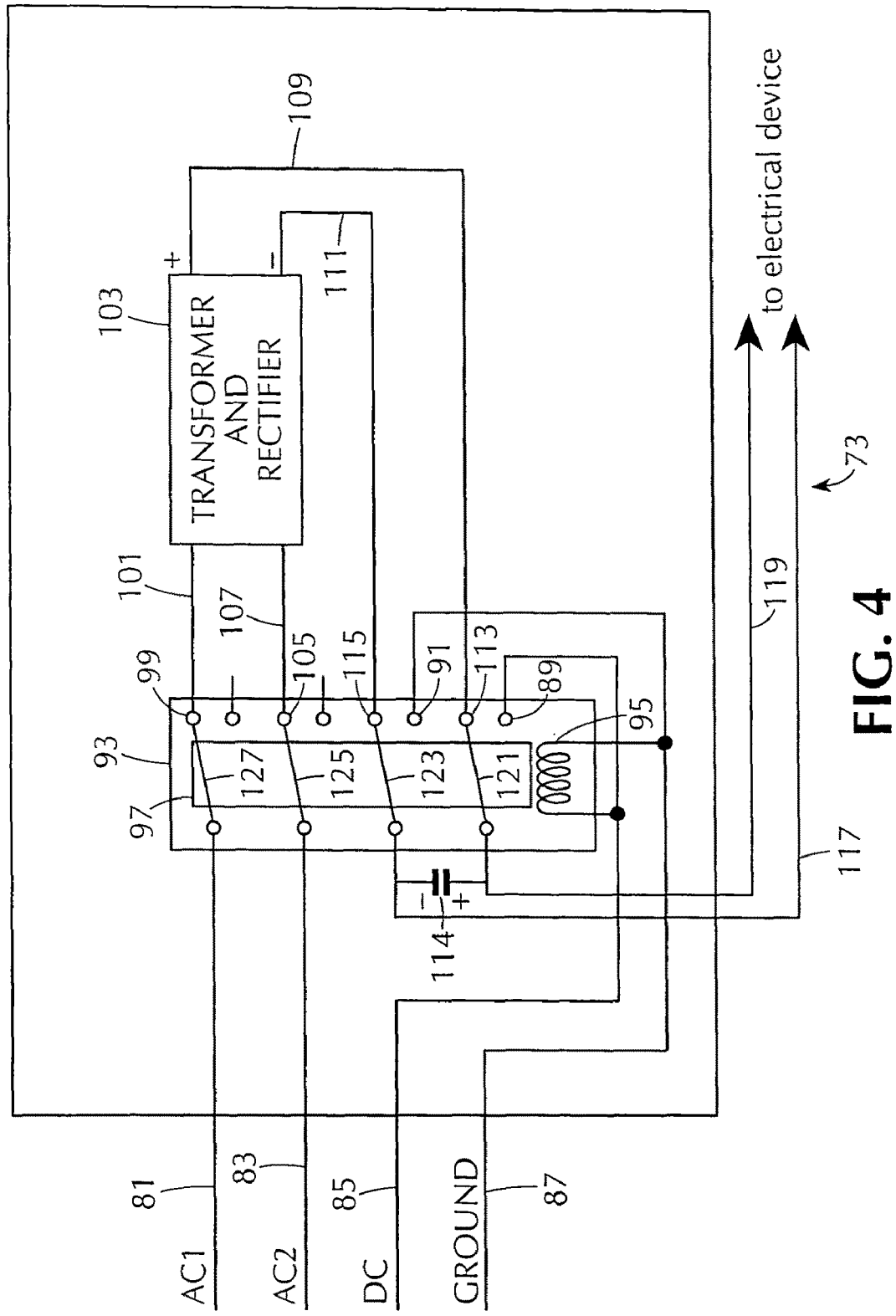
FIG. 4 is a schematic diagram of a power conditioning circuit for use with a plug as shown in FIGS. 3A and 3B in a condition when DC power is not present at the associated socket.

Referring to FIG. 4, a power conditioning circuit is shown that may be supported inside a housing of the plug body 61, or may be connected between power cord 73 and the electrical device associated with plug 61. The purpose of this power conditioner is to either transmit the DC power to the electrical device when DC power is available in the middle recess 55 of the socket the plug is plugged into, or to receive the AC power from the contacts in slots 51 and 53 and convert it to DC power that is supplied to the electronic device.

FIG. 4 shows a circuit of the preferred embodiment for providing power in this way. Each of the four prongs 65, 67, 69, 71 connects in the plug 61 to a respective wire 81, 83, 85 or 87. FIG. 4 shows a neutral position of the circuit, meaning the circuit condition that occurs when there is no DC electrical current applied at line 85.

Wires 85 and 87 carry the DC current and the ground connection respectively and extend around to connect to points 89 and 91 on switches in the multiple switch relay 93. The DC current, when present, passes through these lines and also through magnetic coil 95 bridging the two lines 89 and 91. This DC current magnetizes the coil, which causes the central switch member 97 to move away from its biased or default position, shown in FIG. 4, to a second switch position, seen in FIG. 5, where all four of the switches are changed to the opposing contact. On the other hand, if there is no DC current provided at the prong 71, such as in a case where an ordinary socket is being used that does not provide DC current, or when the DC power supply in the building 1 is for some reason not operating, then the magnetic coil 95 is not magnetized and the switches remain in the position they are biased to i.e. the position shown in FIG. 4.

In the condition of the circuit shown in FIG. 4, AC operation in the absence of DC current, the lead 85 going to the DC current source simply ends at pin 89. The AC1 (or phase) AC current flows through line 81 to relay switch point 99 and along conductor 101 to transformer and rectifier 103. The AC neutral current AC2 flows along line 83 to pin 105 and then along conductor 107 to the transformer and rectifier 103, which converts the 110 volt 60 hertz AC to DC output through lines 109 and 111 as the two poles of 12 volt DC current. These lines 111 and 109 connect with relay pins 113 and 115, and the DC current flows back across the relay switch 93 to electric device power lines 117 and 119 going to the DC electrical device connected with the plug 61. The electrical device in this scenario therefore is operating on transformed DC power derived from the AC current provided at the socket.

Figure 5:
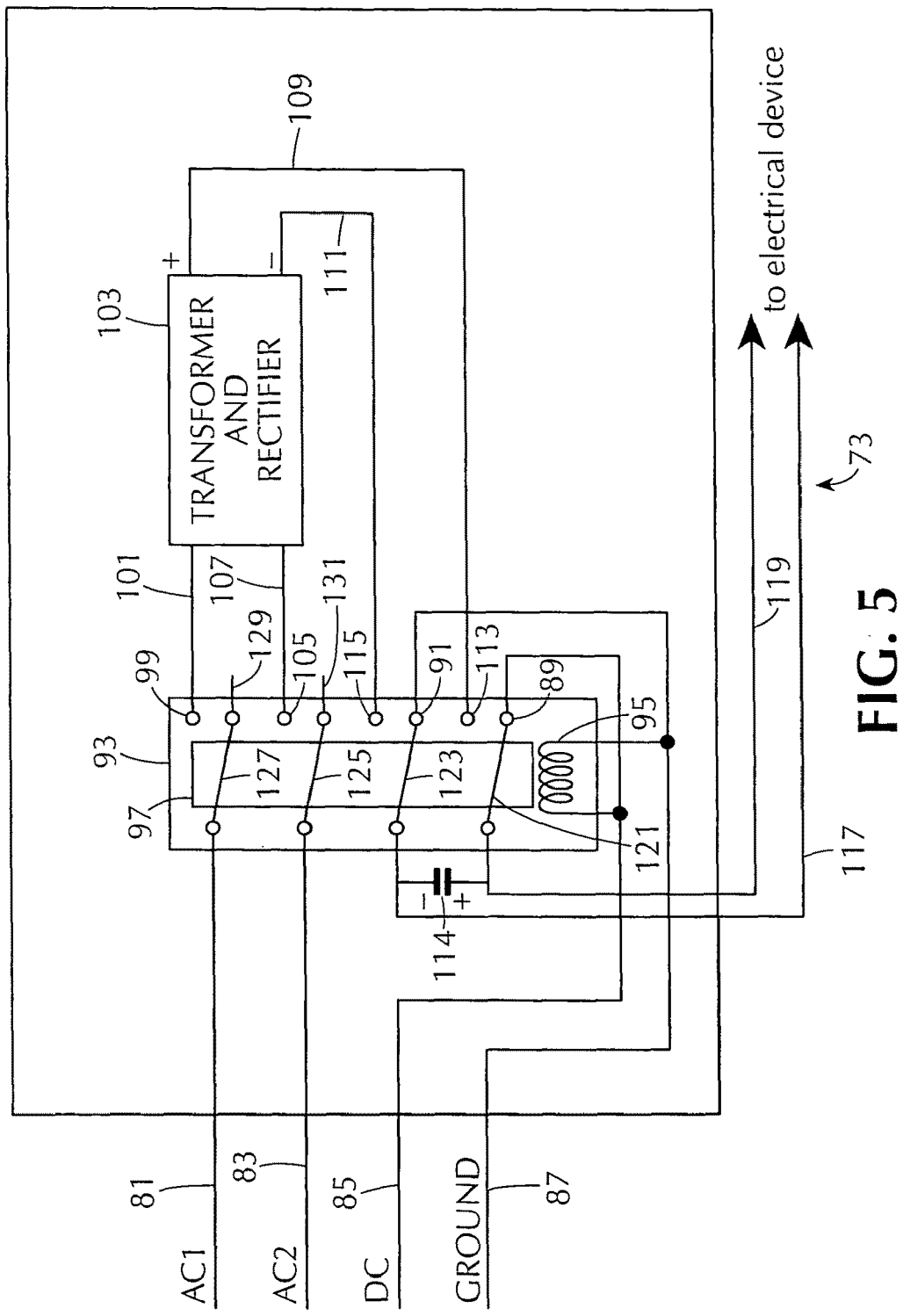
FIG. 5 is a view of the circuit of FIG. 4 in a condition when the DC current is available at the associated socket.

On the other hand, when DC current is provided the power conditioning circuit changes to the conditions shown in FIG. 5. The coil 95 is energized, causing member 97 to shift and to move the switches of relay 93 to the opposite switch positions. Specifically, the switch 121 connects with pin 89 and switch 123 connects with pin 91, and DC power flowing through line 85 from the DC prong of the plug 71 flows through switch 121 of the relay 93 and on to line 119 to the electrical device. Similarly, line 117 to the electrical device is connected via switch 123 to the contact point 91 and to the line 87 to ground. This results in a closed DC circuit such that the electrical device is powered by bridging the DC power and the ground connections supplied at the socket.

The DC current supplied to the electrical device is according to this design a 12 volt DC current. The manufacturer recommended voltage of a DC device can be potentially less than this, e.g., 8 or 5 volts. Under most circumstances, even if the standard operating voltage is less than 12 volts, a voltage of 12 volts may be applied to the devices. However, if a reduced voltage is desired, an additional reduction in voltage can be made between the output of the output lines 117 and 119 and the electrical device attached thereto by any structure known in the art, such as a resistor, or a zener diode, a voltage regulator, etc.

If the plug is in the socket and there is a sudden loss or arrival of the DC current, the process of switching between AC and DC operation might result in an undesirable irregularity in voltage or a spike supplied along output lines 117 and 119. To avoid this, a capacitor 114 is connected between leads 117 and 119, so as to hold the voltage for a moment during switching between AC and DC.

In addition, the circuit may be coupled with a UPS (Uninterrupted Power Supply) to supply 12 volt DC power in the event of a full power loss. The UPS may be connected locally to the circuit or at the battery 21 of the power system.

Figure 6:
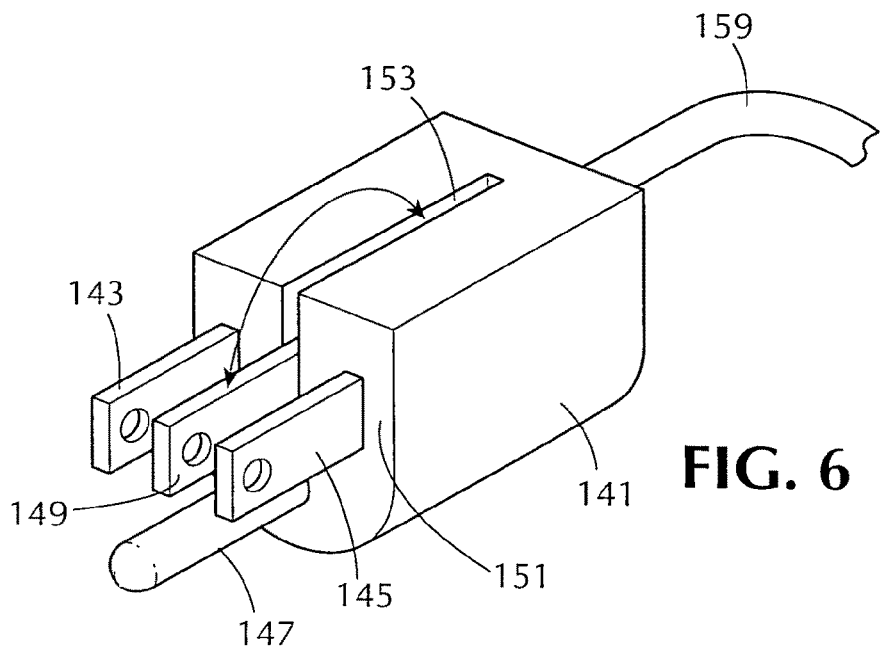
FIG. 6 is a perspective view of an alternate embodiment of plug for use in a system of the invention.

FIG. 6 shows an alternate embodiment of plug which may be used with the socket design of the preferred embodiment. This alternate embodiment plug 141 has four prongs that can be inserted into the corresponding recesses of the socket 37. Prongs 143 and 145 correspond to AC power connection prongs of a standard two-prong plug and prong 147 corresponds to the standard ground third prong of a standard three-prong plug. The middle prong 149 is configured to enter into the middle recess 55 of the socket 37 to contact the DC current supply therein.

When the plug 141 is to be used that does not provide this DC current recess 55, the prong 149 is supported pivotally so that the prong can rotate about a pivot point and be housed in or can rotate into a position extending away from the front face 151 of the plug and to be contained within recess 153 in the plug body. This design improves the profile of the plug for crowded multiple socket fixtures.

Figure 7:
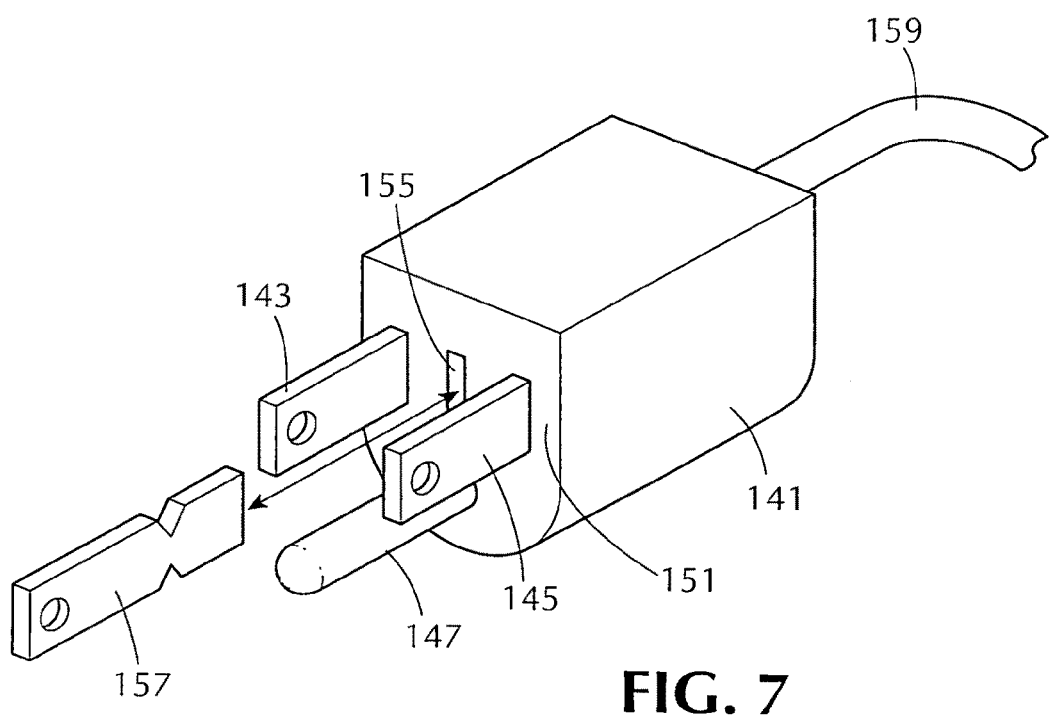
FIG. 7 is a perspective view of still another alternate embodiment of plug for use in a system of the invention.

FIG. 7 shows another alternate embodiment of plug wherein the reference numbers are the same as in the corresponding parts of FIG. 6. The plug body 141 supports the three prongs 143, 145 and 147 of a standard three-prong plug. In addition, the plug has a recess 155 therein that receives the center prong 157, which is removable by simply pulling it from the recess. When inserted in the recess, prong 157 makes an electrical contact with one of four wires that extend from the back of the plug body 141 to cord 159 which extends to the electrical device or to a power conditioning circuit as in FIGS. 4 and 5 that links to an electrical device.

Figure 8:
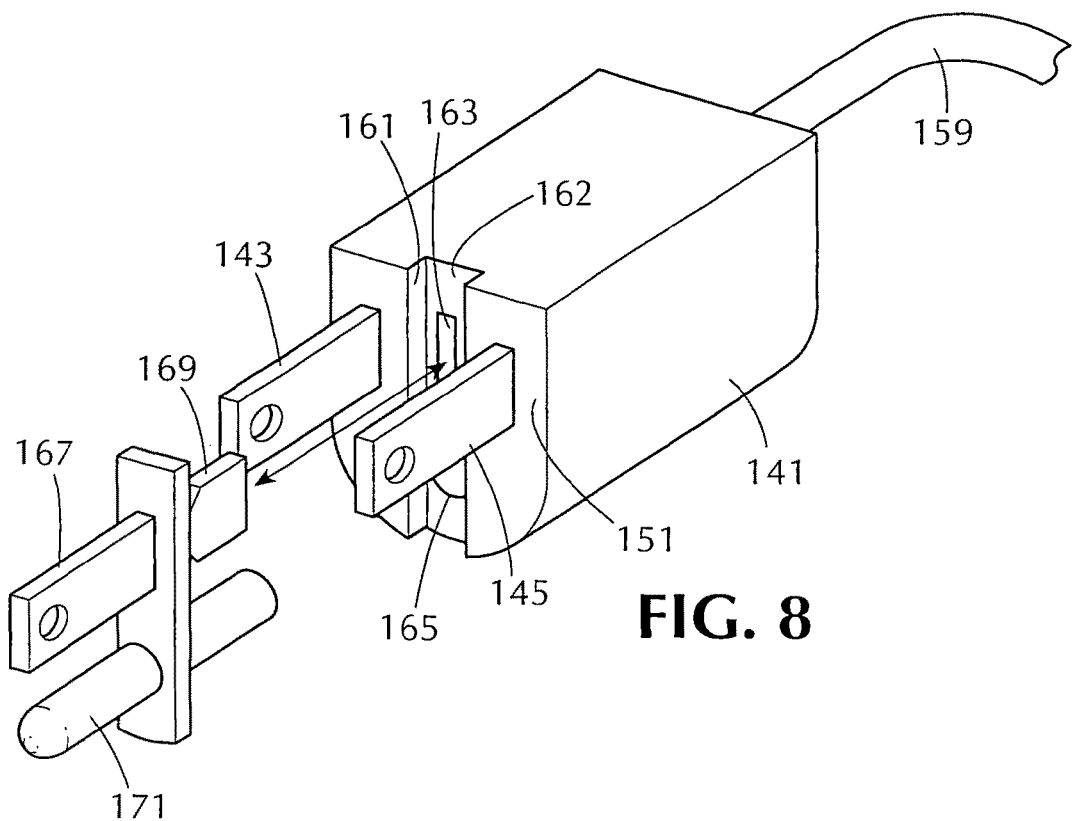
FIG. 8 is a perspective view of still another alternate embodiment of plug for use in a system of the invention.

FIG. 8 shows a further alternate embodiment of plug in which the plug body 141 supports prongs 143 and 145 in the usual position for a standard two-prong plug. The plug body 141 also has a recess 161 in forward facing surface 151. The recess 161 has a forward facing recessed or indented surface 162 parallel to the front face 151 of the plug. This inset face 162 has recesses 163 and 165, in which there are respective electrical contacts to receive a prong 169 inserted in recess 163 so as to connect with the DC conductor in cord 159, and a generally cylindrical prong 171 inserted in recess 165 so as to connect to a ground line in the electrical cord 159. The DC current prong 167 has a rearward portion 169 that is securingly received in the recess 163 and projects forward from the face 151 at an appropriate distance and in an appropriate distance to fit into the corresponding recess 55 in the socket to which the plug is inserted and make electrical contact. Similarly, prong 171 has a cylindrical shape and is securingly but releasably or removably inserted into recess 165 to secure an electrical contact with the ground wire in the cord 159 and once placed in the recess is held therein securely enough to use the plug in a socket 37 as well, wherein the prong 171 enters into and makes electrical contact in the ground connection opening 57. The two prongs 167 and 171 are carried in a support member 170, which keeps the prongs together and spaced appropriately for insertion into recesses 163 and 165. Support member 170 fits into recess 162 when the prongs 167 and 171 are inserted into the plug 141 so that the support member is flush with or at least does not extend forward of the front face 151 of the plug 141.

Figure 9:
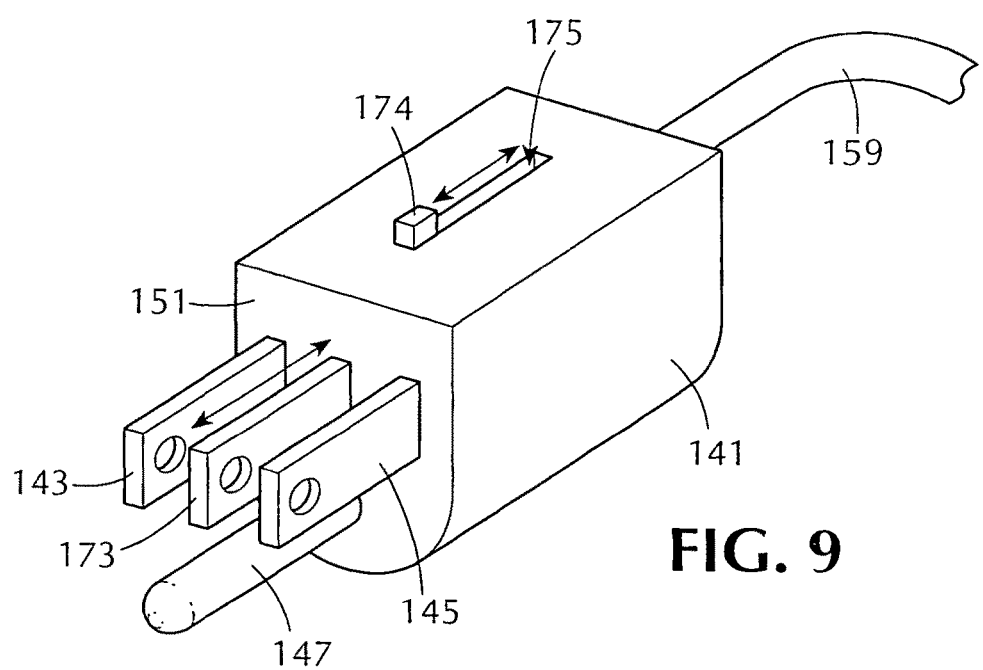
FIG. 9 is a perspective view of still another alternate embodiment of plug for use in a system of the invention.

FIG. 9 shows a further alternate embodiment where the plug body 141 supports prongs 143, 145 and 147 in the positions for a standard three-prong plug. A fourth prong, 173, is supported between prongs 143 and 145 for reciprocal sliding movement forward and rearward of the front face 151 of the plug body. The prong 173 is supported by a sliding structure in the plug body, and is connected with the raised thumb knob 174 of a manual slide generally indicated at 175. Knob 174 of the manual slide 175 can be moved toward the front face 151 of the plug, in which case the prong 173 projects forward so as to be configured to enter and access DC current in the socket 37 to be transmitted over cord 159, and it can also be drawn in the other direction, away from the front face 151, wherein the prong 173 is completely retracted to the level of the face 151, and the plug can be used with a standard three-prong AC socket that does not have the DC recess 55.

Figure 10:
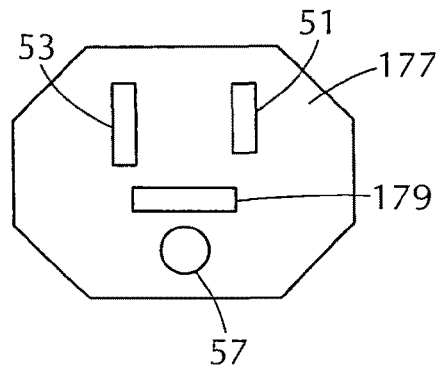
FIG. 10 is a front view of a socket according to an alternate embodiment of the invention.

FIG. 10 shows an alternate face socket design 177. The standard three-recess socket locations of the recesses for 51, 53, and 57 are provided in the face so that a standard AC three prong plug or a standard two prong AC plug can be inserted therein. In addition, socket face 177 also has a fourth recess 179 therein, which is located intermediate the two prong recesses 51 and 53 and the ground prong recess 57. Recess 179 has contacts therein that also connect with a DC current power source, e.g., line 39. The corresponding plug consequently has a DC current prong shaped and positioned to enter into the middle position where recess 179 is located.

Figure 11:
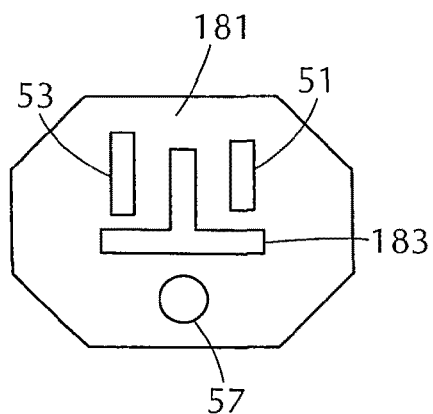
FIG. 11 is a front view of a socket according to another alternate embodiment of the invention.
Figure 12:
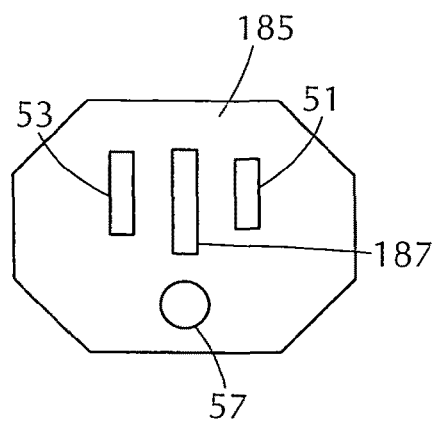
FIG. 12 is a front view of a socket according to still another alternate embodiment of the invention.

FIGS. 11 and 12 also show alternate embodiments of faces of sockets 181 and 185. The sockets have recesses therein for a standard three-prong plug, i.e. recesses 51, 53 and 57. The faces 181 and 185 are also provided with a differently configured opening for DC current access, these being T-shaped recess 183 and elongated recess 187. The corresponding prong of a plug accessing DC current from the contacts in this recess is configured in a similar shape, i.e. a T-shaped or a vertically longer blade prong, so as to engage electrical contacts in each of the corresponding recesses when inserted therein.

Figure 14:
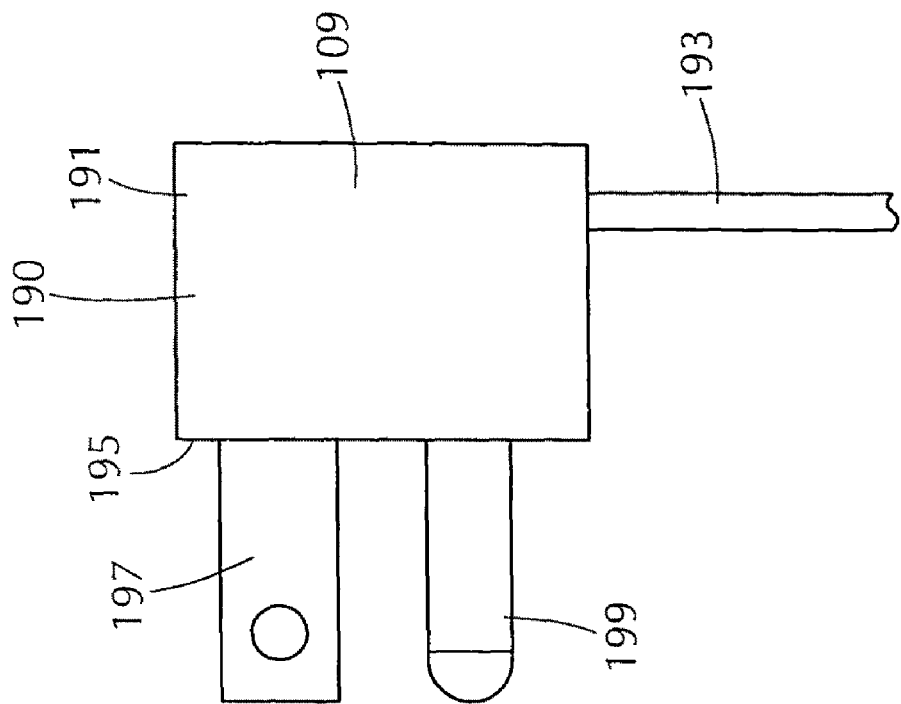
FIG. 14 is a side view of the plug of FIG. 13.
Figure 13:
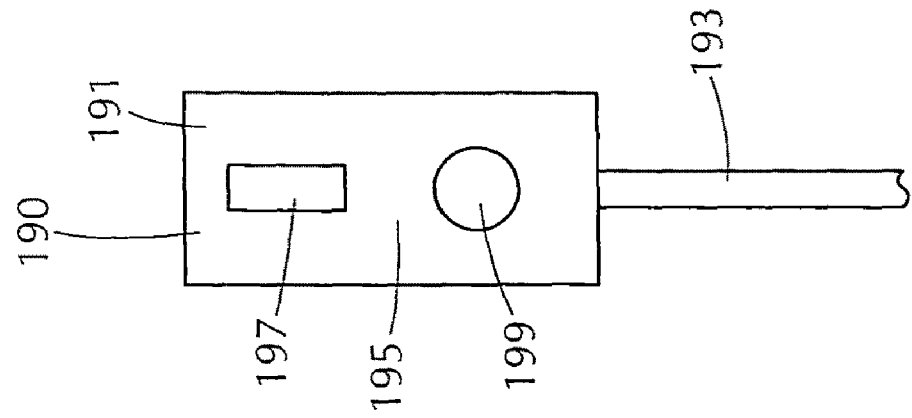
FIG. 13 is a front view of a plug for use to access only DC current form the socket of FIG. 2.

FIGS. 13 and 14 show a front and side view of a further alternate embodiment plug, which is provided for use with a socket such as shown in FIG. 2. This plug comprises a plug body 191 at the end of a cable 193 running to the electrical device. The plug 190 has two prongs extending forwardly from the face 195 of the plug. One prong 197 is configured to be received into recess 55 of socket 37, wherein this prong contacts the DC current supply wires. Prong 199 is configured to extend into the ground opening of 57 in socket 37 so as to make electrical contact with a contact that connects with ground. This type of plug 190 is usable to draw the DC current from the socket 37 without the need for a power conditioning circuit. Two wires run from this plug to the electrical device and carry DC current from the socket to the device when DC current is available. There is no transformer or rectifier required for this since there is no AC current connected with this particular plug.

This plug may also be used with an adaptor that is configured to receive the two prongs 197 and 199 and connect them at the other end to a male connector that can be inserted into and connected electrically with the female cigarette lighter socket of an automobile electrical system. Automobile electrical systems generally transmit 12 volt DC current, so operation is similar to that when inserted into a socket such as seen in FIG. 2, in which 12 volt DC current supplied.

Reference is made herein to "standard" socket design, which in the preferred embodiment has been the standard plug and socket design for U.S. and Canadian electrical systems. Where the system and method of this invention are used in different countries, the standard plug and socket can be the plug and socket design of that particular country or region, with the modification of the removable DC connection prong as appropriate. For instance, in European plugs and socket arrangements, which have two cylindrical prongs received in two circular recesses and a recess in the plug that receives a ground contact from the socket, a DC prong may be placed removably or movably on the European plug with a conforming recess such as recess 55 in the European style socket.

Figure 15:
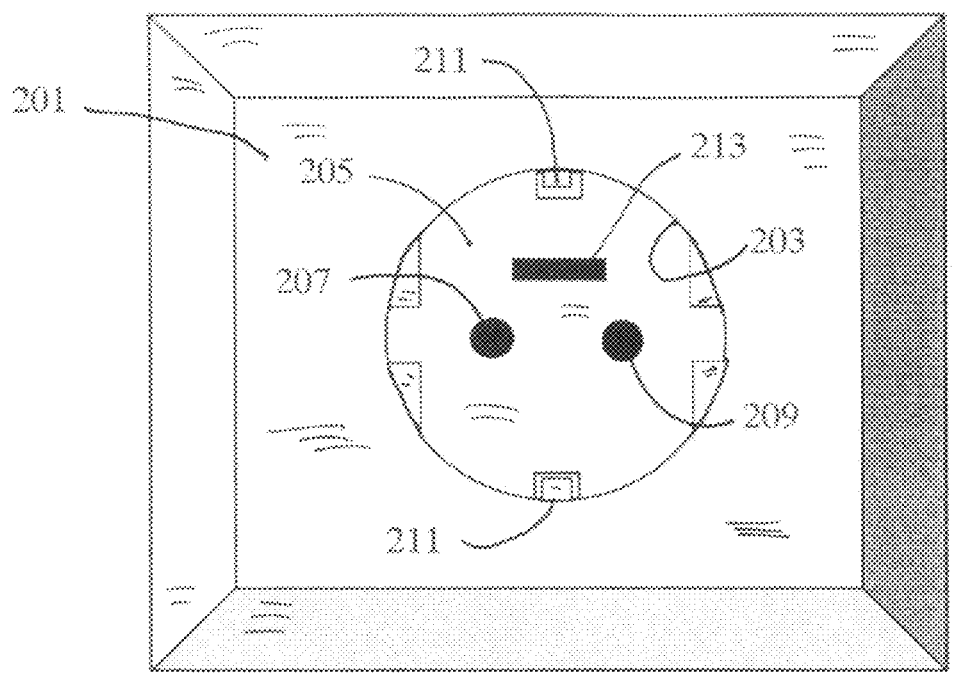
FIG. 15 is a front view of an alternate embodiment of the invention employed in a European-style socket.
Figure 16:
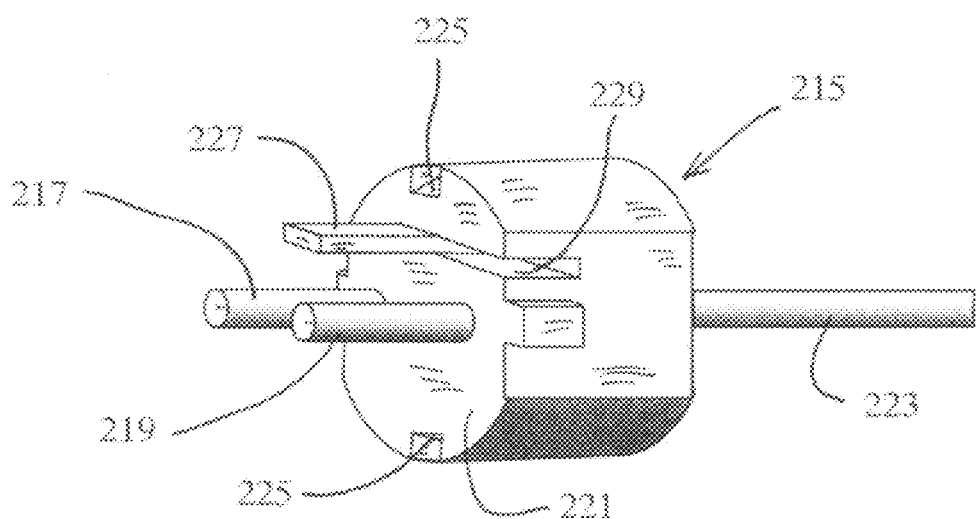
FIG. 16 is a perspective view of an alternate embodiment of plug according to the invention for use with the socket of FIG. 15.
Figure 17:
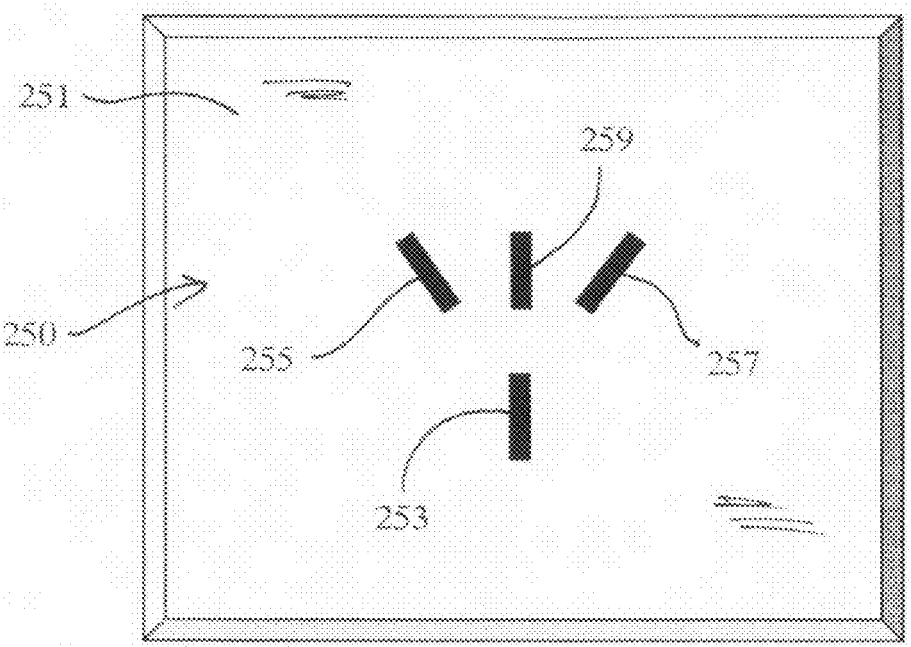
FIG. 17 is a front view of an alternate embodiment of the invention employed in a socket of a still different design employed in other countries.

This is illustrated in FIGS. 15 and 16. As seen in FIG. 15, and as is well-known in the art, wall socket 201 has a cylindrical recess 203 therein with a back face 205. Back face 205 has two recesses 207 and 209 that each provides a respective pole of two poles of AC power, e.g., AC1 and AC2. Alternatively, one opening has a contact therein that transmits one phase of an AC current and the other is a ground. The socket 201 further has metallic contacts 211 that connect to ground. According to the embodiment of the invention, the back face 205 has a further DC recess 213, preferably rectangular in cross section, with a metallic contact therein to contact and transmit DC power to a prong inserted therein.

As best seen in FIG. 16, a plug 215 for use with such a socket 201 has two prongs 217 and 219 projecting from its forward face 221, and these prongs 217 and 219 are configured the same as in a standard European socket so as to enter into and electrically connect with socket openings 207 and 209. Plug 215 is also provided with flat tongue ground contacts 225 that are configured to contact and ground with flat exposed tongue ground contacts 207 in the socket 201. The ground contact is redundant due to two contacts.

Plug 215 also has a DC prong 227 that is pivotally supported in plug 215 so that the DC prong 227 can be positioned as seen in FIG. 16, so as to enter into DC opening 213 and make an electrical contact therein and receive DC power. Alternatively, DC prong 227 can be pivoted so that it extends within recess 229 behind the plane of the face 205 so that plug 215 fits into a standard European socket that doesn't have opening 213.

The prongs 217, 219 and 227 and the ground contacts 225 connect with four lines through cord 223 that runs to a power supply as shown in FIG. 5 so as to power an associated electrical device (not shown) by DC when available, or AC when DC is not available.

Figure 18:
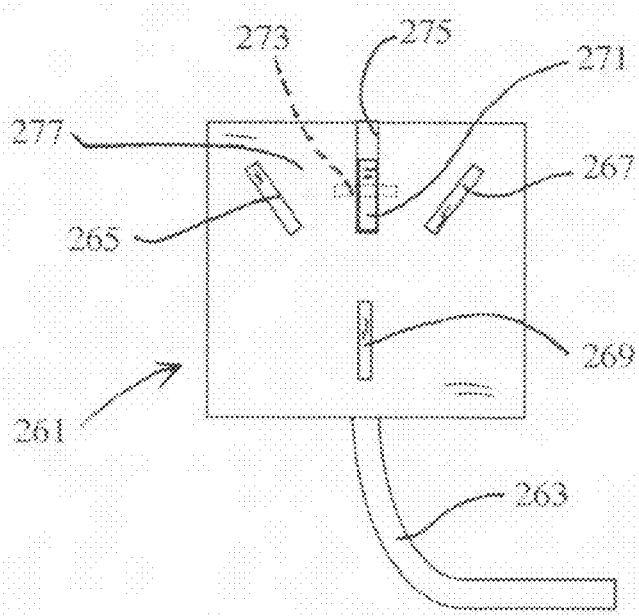
FIG. 18 is a front view of an alternate embodiment of plug according to the invention for use with the socket of FIG. 17.

The invention may similarly be applied to other types of sockets and plugs. For example, as seen if FIGS. 18 and 19, a socket 250 of still another design, such as used in other countries, e.g., Argentina or Australia, has a front face 251 with recesses 253, 255, and 257 therein supplying two poles of AC power and a ground contact. To the conventional socket of this design is added a fourth DC recess 259 that supplies DC power to the socket, and is configured to form an electrical contact with a prong inserted therein. FIG. 18 illustrates a plug 261 for use with such a socket 250. Plug 261 connects with a four-conductor cord as in the previous embodiment. Prongs 265, 267 and 269 are configured as a standard plug of this design and these prongs fit into the recesses 253, 255 and 257. A fourth DC prong 271 is pivotally supported on pivot 273 in recess 275, so as to be selectively rotated to a position as shown wherein the prong 271 projects forwardly from the face 277 of the plug 261, so as to enter into socket opening 259 and contact DC current therein. The prong 271 may also be rotated to a position extending vertically in recess 275 such that prong 271 is completely behind face 277 and the plug 261 may be used with a standard socket that does not have a DC slot 259. As with the previous embodiment, a power supply as seen in FIG. 5 links the plug 261 to an electrical device.

FIG. 19 shows a system by which a device powered through a plug according to the above embodiments may be powered from an automobile electrical system, which typically generates about 12 volts DC current. The socket adaptor 301 has an automotive circuit connector 303 of a standard configuration that is received in the opening 305 of the DC power socket (also sometimes the cigarette lighter) 307 of an automobile. Connector 303 has electrical contacts 309 and 311, as are well known in the art, that contact electrical contacts in opening 305 and receive both sides of a DC power circuit therein. The two poles of the DC power are connected with socket portion 313 of apparatus 301, one pole being connected with slot 315 and the other with round opening 317. Prongs 319 and 321 of plug 323 are configured to be inserted in the slot 315 and the opening 317 so as to form electrical contact therein and complete the circuit through an electrical device, not shown, connected to cord 325.

The plug 323 and its prongs 319 and 321 are configured to work with a socket such as shown in FIG. 2 as well. As a result, with the connector 301, the electrical device may be powered in an automobile or in a wall socket with DC power.

To enhance the shifting of an electrical device from a wall socket as in FIG. 2 to an automotive electrical system as seen in FIG. 19, the socket portion 313 may have a design with a face 401 as seen in FIG. 20. the face 410 has additional dummy apertures 403 and 405 that receive the AC prongs of a plug as shown in FIG. 3A, but provide no electrical contacts. The recesses 407 and 409 correspond to recesses 315 and 317 respectively in FIG. 9, and these do have electrical contacts with the connector 301 and the electrical system 307 of the automobile. Accordingly, a plug as seen in FIG. 3A for an AC wall socket with the DC enhancement can be used to power the associated electrical device plugged into apparatus 301 plugged into a cigarette lighter 307 of a car.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. A power supply system comprising:
   an electrical power generating device producing DC electrical power in the form of a DC electrical current;
   a DC current conductor receiving the DC electrical current from the electrical power generating device, said DC current conductor carrying said DC electrical current to a socket; and
   an AC power system transmitting AC electrical current to the socket so that said socket can be accessed by a plug inserted therein to receive therefrom the DC current or the AC current;
   wherein the socket has two recesses therein, each recess having a respective contact therein and being configured to receive a respective prong, and to make a respective electrical contact with said plug therein, first and second of said contacts transmitting complimentary poles of the AC electrical current, respectively; and
   the socket having a third contact transmitting the DC current and configured to contact an electrical contact structure of the plug so as to supply the DC current thereto, and
   said socket having a fourth contact therein engageable with the plug to make a further electrical contact therewith, said fourth contact connecting with a grounded connection; and
   wherein an electrical device having a device plug is plugged into said socket, said socket having a third recess with the third contact therein, said device plug including a DC prong inserted in and engaging the third contact in the third recess and a ground contact of the plug engaging the grounded contact, said electrical device deriving DC power from a circuit formed between the DC prong and the ground contact; and
   wherein the socket has a grounded recess therein configured to receive a standard plug ground prong in which recess the fourth contact is supported, and the ground contact of the plug is a second prong on said plug configured to be received in the grounded recess, and said plug further comprises a pair of AC prongs configured to be inserted in said two recesses and to receive said AC electrical current therefrom;
   said DC prong and the second prong being releasably connected with the plug, such that the said DC prong and the second prong can be removed from the plug such that the plug can then be inserted into another socket having only two standard AC power prong recesses therein, and said DC prong and the second prong can be secured to the plug so that said DC prong and the second prong can access DC power from said socket.

2. The power supply system of claim 1, wherein has a third recess with said third contact therein, and said socket is configured to receive a first plug having a first prong configuration so as to supply to said first plug the DC current, and to receive a second plug having a second prong configuration so as to supply the AC current to said second plug.

3. The power supply system of claim 1, wherein the complementary poles are phase and neutral.

4. The power supply system of claim 1, wherein the recesses are positioned such that a standard two-prong AC plug when plugged into the socket engages the first and second contacts and creates an AC power circuit therewith.

5. The power supply system of claim 1, wherein the electrical power generating device comprises a solar panel deriving said electrical power from sunlight.

6. The power supply system of claim 1, wherein the electrical power generating device comprises a wind generator.

7. The power supply system of claim 1, wherein the system is installed in a building and the socket is supported in a wall structure of said building.

8. The power supply system of claim 1, wherein a battery is connected with the electrical power generating device so that the battery receives a charge when the electrical power generating device is producing said DC current, and such that, when the electrical power generating device is not producing said DC current, the battery discharges a battery DC current to the DC current conductor, which transmits the battery DC current to the socket.

9. The power supply system of claim 1, wherein the AC current is derived at least in part from a portion of the DC current that is converted to AC and supplied to the AC power system.

10. The system of claim 1, wherein the device plug further comprises at least two AC prongs corresponding to prongs of a standard two-prong AC plug, and device plug being connected with the electrical device via a power processing circuit, said power processing circuit providing DC current from the DC prong and the third contact to the electrical device when said DC current is present at said third contact, and converting the AC current from said AC prongs to a local DC current and supplying said local DC current to the electrical device when the DC current is not present at said third contact.

11. The system according to claim 1, wherein said DC prong and the second prong are supported together on a member removable therewith such that the further prong and the ground prong are removed from the plug body together.

12. A power supply system comprising:
an electrical power generating device producing DC electrical power in the form of a DC electrical current;
a DC current conductor receiving the DC electrical current from the electrical power generating device, said DC current conductor carrying said DC electrical current to a socket; and
an AC power system transmitting AC electrical current to the socket so that said socket can be accessed by a plug inserted therein to receive therefrom the DC current or the AC current;
wherein the socket has two recesses therein, each recess having a respective contact therein and being configured to receive a respective prong, and to make a respective electrical contact with said plug therein, a first and second of said contacts transmitting complementary poles of the AC electrical current, respectively; and
the socket having a third contact transmitting the DC current and configured to contact an electrical contact structure of the plug so as to supply the DC current thereto, and
said socket having a fourth contact therein, engageable with the plug to make a further electrical contact therewith, said fourth contact connecting with a grounded connection; and
wherein the recesses are positioned such that a standard three-contact AC plug when plugged into the socket engages the first and second contacts and creates an AC power circuit therewith, and also contacts with the fourth contact connecting to ground; and
wherein the recess of the third contact is located between the recesses of the first and second contacts.

13. A power supply system comprising:
an electrical power generating device producing DC electrical power in the form of a DC electrical current;
a DC current conductor receiving the DC electrical current from the electrical power generating device, said DC current conductor carrying said DC electrical current to a socket; and
an AC power system transmitting AC electrical current to the socket so that said socket can be accessed by a plug inserted therein to receive therefrom the DC current or the AC current;
wherein the socket has two recesses therein, each recess having a respective contact therein and being configured to receive a respective prong, and to make a respective electrical contact with said plug therein, a first and second of said contacts transmitting complementary poles of the AC electrical current, respectively; and
the socket having a third contact transmitting the DC current and configured to contact an electrical contact structure of the plug so as to supply the DC current thereto, and
said socket having a fourth contact therein engageable with the plug to make a further electrical contact therewith, said fourth contact connecting with a grounded connection; and
wherein an electrical device having a device plug is plugged into said socket, said socket having a third recess with the third contact therein, said device plug including a DC prong inserted in and engaging the third contact in the third recess and a ground contact of the plug engaging the grounded contact, said electrical device deriving DC power from a circuit formed between the DC prong and the ground contact; and
wherein the contact of the plug is a flat tongue ground contact, and the fourth contact of the socket is a corresponding exposed contact configured to engage with the plug contact when the plug is in the socket.

14. A wall socket supplying DC power and AC power in a building,
said wall socket comprising:
a socket face having first and second recesses therein located in positions to receive prongs of a standard two-prong AC electrical plug;
the socket having contacts in said recesses configured to electrically contact said prongs, said contacts each being electrically connected with a respective pole of said AC power so that an AC circuit is formed when a plug having prongs of said two-prong AC electrical plug is inserted in the socket;
said socket having a third contact therein positioned to engage a ground contact of a standard three-wire AC electrical plug, said third contact connecting with ground; and
said socket having a further recess therein having a contact therein configured to engage a plug prong when inserted therein and to supply to said plug prong the DC power, such that a DC circuit is formed between said plug prong and a further ground contact contacting the grounded contact of said third contact; and
wherein the further recess is located between the first and second recesses.

15. An electrical device comprising:
a DC-powered electrical apparatus operable using DC current; and
a plug operatively associated with the DC-powered electrical apparatus so as to supply DC current thereto;
said plug having a plug body; and
said plug having two AC connection prongs supported on and extending from the plug body, corresponding to prongs of a standard two-prong plug;
said plug having a ground prong supported on and extending from the plug body, said ground prong corresponding to the ground prong of a standard three-prong AC plug;

said plug further having a further prong supported on the plug body and extending therefrom adjacent the two prongs; and said further prong and said ground prong being both releasably connected with the plug body such that said further prong and said ground prong may be selectively removed and re-attached to the plug body, such that, when said further prong and said ground prong are removed from the plug body, the plug can be plugged into a standard two-recess AC socket having only two recesses therein and no recess that can accommodate a standard ground prong.

16. The electrical device according to claim 15, wherein a power conditioner is connected between the plug and the electrical apparatus, said power conditioner being electrically connected with the prongs of the plug and receiving AC current from the AC connection prongs, when the further prong is not receiving DC current, said power conditioner converting the AC current to DC current and supplying said DC current to the electrical apparatus, and when the further prong is receiving DC current, said power conditioner supplying said DC current from the further prong to the electrical apparatus.

17. The electrical device according to claim 15, wherein said further prong and said ground prong are supported together on a member removable therewith such that the further prong and the ground prong are removed from the plug body together.

18. An electrical device comprising:

a DC-powered electrical apparatus operable using DC current; and a plug operatively associated with the DC-powered electrical apparatus so as to supply DC current thereto;

said plug having a plug body; and said plug having two AC connection prongs supported on and extending from the plug body, corresponding to prongs of a standard two-prong plug;

said plug further having a further prong supported on the plug body and extending therefrom adjacent the two prongs; and said further prong being removable from the plug body, or being movably supported on the plug body so that said further prong may be removed or moved so that the plug can be plugged into a standard two-recess AC socket; and wherein the plug also has a ground connection contact structure corresponding to a standard ground contact for the plug, and said further prong is supported so as to be moved between a first position, wherein said further prong can be received in a three-slot socket with the three prongs, and a second position, wherein said further prong does not interfere with insertion of the three prongs into a standard two-recess AC socket.

19. The electrical device according to claim 18, wherein said further prong is pivotally supported so as to rotate about a pivot between the first and second positions.

20. The electrical device according to claim 18, wherein the plug is inserted into a connector configured to be inserted into a DC power socket of an automobile electrical system, the connector having two recesses therein receiving the ground connection prong and the further prong of the plug, and connecting said ground connection prong and said further prong to respective poles of the DC power socket, such that the electrical device is powered by said automobile electrical system.

21. An electrical device comprising:

a DC-powered electrical apparatus operable using DC current; and a plug operatively associated with the DC-powered electrical apparatus so as to supply DC current thereto;

said plug having a plug body; and said plug having two AC connection prongs supported on and extending from the plug body, corresponding to prongs of a standard two-prong plug;

said plug further having a further prong supported on the plug body and extending therefrom adjacent the two prongs; and said further prong being removable from the plug body, or being movably supported on the plug body so that said further prong may be removed or moved so that the plug can be plugged into a standard two-recess AC socket; and wherein said further prong is between the AC connection prongs of the plug.

* * * * *